United States Patent [19]

Erdelyi

[11] 4,059,031
[45] Nov. 22, 1977

[54] METHOD AND APPARATUS FOR THE PRODUCTION OF MACHINE TOOLS

[76] Inventor: Frank F. Erdelyi, 313 Foxhall St., Raleigh, N.C. 27609

[21] Appl. No.: 658,271

[22] Filed: Feb. 17, 1976

Related U.S. Application Data

[63] Continuation of Ser. No. 455,632, March 28, 1974, abandoned.

[51] Int. Cl.² .................. B21K 5/02; B21D 19/00; B21C 23/04
[52] U.S. Cl. .................. 76/108 R; 72/96; 72/100; 72/264
[58] Field of Search ............ 76/108 R, 108 T, 101 R; 72/100, 264, 64, 96; 408/144

[56] References Cited

U.S. PATENT DOCUMENTS

| | | | |
|---|---|---|---|
| 2,148,805 | 2/1939 | Cogsdill | 76/108 R |
| 2,764,042 | 9/1956 | Gotze | 76/108 T |
| 2,935,906 | 5/1960 | Andreasson | 408/144 X |
| 3,031,553 | 4/1962 | Erdelyi | 72/100 |
| 3,347,079 | 10/1967 | Rowell | 72/264 |
| 3,555,935 | 1/1971 | Dorrenberg | 76/108 T |

Primary Examiner—Leonidas Vlachos
Attorney, Agent, or Firm—Fred Wiviott

[57] ABSTRACT

A method and apparatus as disclosed, to produce a work piece, for example — a twist drill or the same with inside cooling channels by means of a core matrix or core pins incorporated with the deforming pass, instead of using fusable metal filling. The points of the core matrix or core pins are located in the narrow pass of the forming caliber and remain fixed until the work piece is processed. At the end of the forming process, the work piece with its inside, open cooling channels, is expelled and a new operation starts.

20 Claims, 11 Drawing Figures

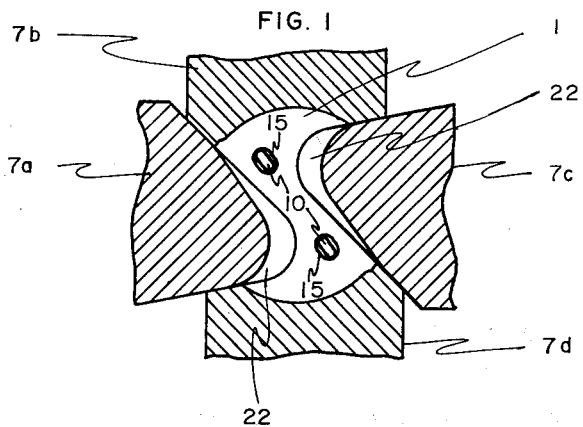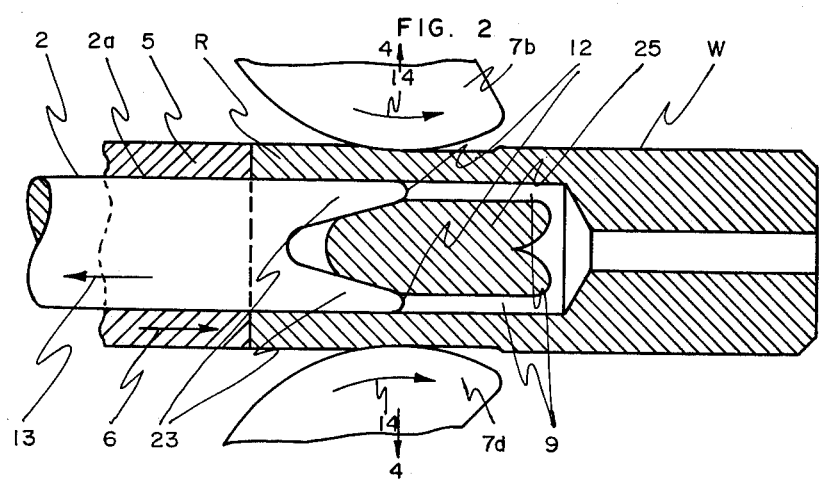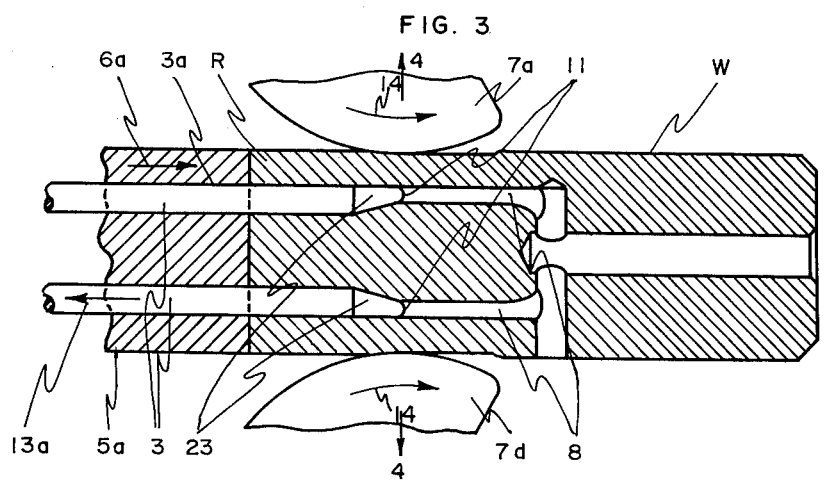

FIG. 8
FIG. 9
FIG. 10
FIG. 11
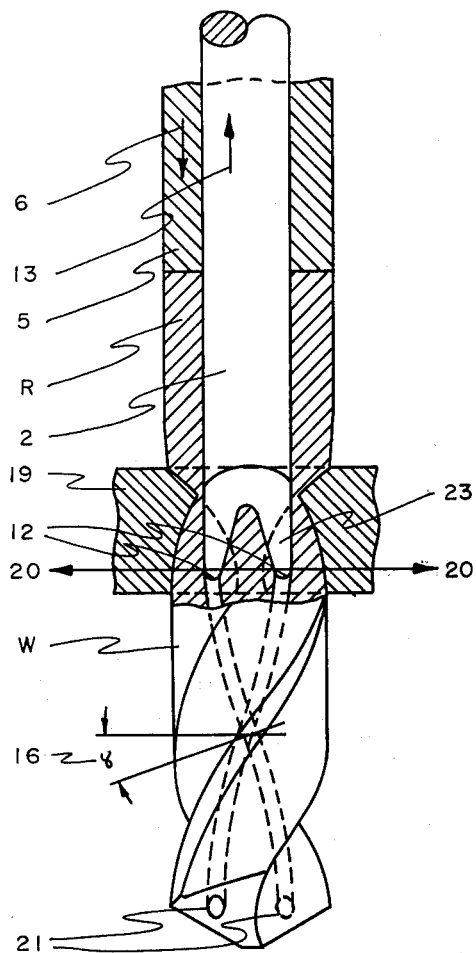
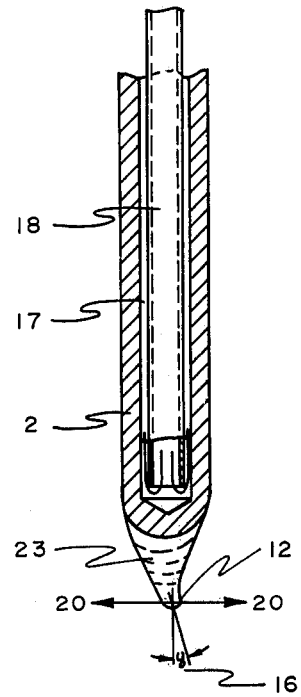
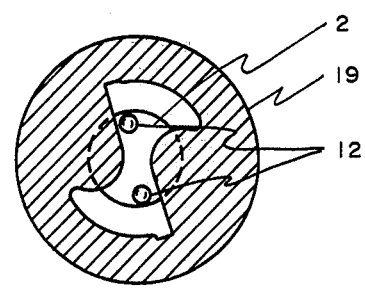

METHOD AND APPARATUS FOR THE PRODUCTION OF MACHINE TOOLS

This is a continuation, of application Ser. No. 455,632, filed Mar. 28, 1974, now abandoned.

This invention relates to machine tools and more particularly to the method and apparatus for producing spiral type drills with interior cooling channels.

Three separate processes have been developed according to the latest status of technology for the manufacture of twist drills with inside cooling channels. The most commonly used consists of machining a blank with bores corresponding to the necessary cooling channels and then finishing subject blank by milling or rolling operations.

The second process deviates from above only in that the blank has two indentations grooves each other either by means of forging or by means of rolling, prior to machining the channels. Further work on the blank is identical to the above, i.e., milling or rolling operations.

The newest development to provide for inside cooling channels consists of an extrusion operation. In spite of the fact that the drill will be formed with inside cooling channels in a single operational step, this method contains certain difficulties. For example — to avoid closing of the channels. In this regard, a certain filling substance is used (for example copper) when forming is concluded which must be melted out. Technical disadvantages of this process further lie in the fact that the core thickness along the spiral of the drill remains constant. It is not solved at this time on how to decrease the thickness of the drill core along its axis. Further, due to difficulties connected with the melting of the filling material, the production of smaller drills remains impossible, i.e., under 10 mm diameter.

One should mention here attempts to product drills containing inside channels by roll forging. Trials were conducted according to an extrusion operation to fill the blank with a filling material, for example copper wire, with subsequent rolling on a roll forging machine. It became known that the blank, when roll forged, is subject to a reduction in area (approximately 50%) due to a rotational movement. Thus, the inside channels migrated periodically in the drill core and became closed in spite of the inlay.

As a countermeasure, theoretically one could deform the blank prior to the rolling process in a direction opposite to the spirals. This would make the process of extrusion and its problems applicable to roll forging.

In order to eliminate the above difficulties which prohibited the production of drills with inside cooling channels on a large scale, the subsequent process was developed which permits production of twist drills by roll forging, incorporating inside cooling channels without the usage of a foreign filling substance.

The invention consists of producing drills or alike with inside cooling channels by means of core matrix or core pins incorporated in the forming pass by roll forging or extruding in a single operational step.

To use the process for drills above 2 mm diameter, one can make use of a steel tube commercially available or a concentrically bored work blank. For bigger dimensions, for example above 5 mm diameter, a round work blank can be used with pre-bored channels.

Using the invention for drills with a diameter above 30 mm, it would be recommended to divide the rolling process into two operational steps subsequent to each other with the first step as a straight rolling operation. The second step can then consist of a roll forging or other forming process. The core matrix, or respectively the core pins with the roll pass, which are primarily used in the first step can, when producing drills above 30 mm diameter, also be used in the second forming step.

In view of the above, it is an object of the present invention to provide an improved process for producing twist type drills having interior channels therein.

Another object of the present invention is to provide an improved apparatus for producing twist type drills having interior channels therein.

An even further object of the present invention is to provide an improved means and method for producing twist type drills having cooling channels formed therein.

Other objects and advantages of the present invention will become apparent and obvious from a study of the following description and the accompanying drawings which are merely illustrative of such invention.

IN THE DRAWINGS

FIG. 1 is a sectional view of the rolling tools and the laid-in core matrix of the present invention;

FIG. 2 is a sectional view of the product being produced into a rolled twist drill;

FIG. 3 is an axial sectional view of a twist drill over 5 mm diameter;

FIG. 8 is a sectional view of a variation of the present invention;

FIG. 9 is a longitudinal sectional view of the core matrix for a known extrusion pressing operation;

FIG. 10 is the core matrix as viewed from the tip of the core pins; and

FIG. 11 is a sectional view of the ring caliber with in-laid core matrix.

Figure 4:
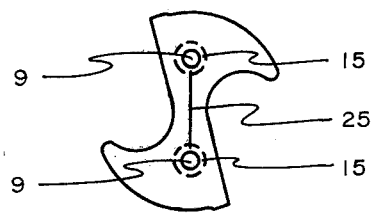
FIG. 4 is a sectional view of the product produced.

We will now discuss the process to produce machine tools, i.e., drills or alike with inside cooling channels by means of roll forging or extruding press in more detail on the basis of FIGS. 1 - 11:

FIG. 1 shows a section of the roll pass 1 in plane 4—4 of the rolling tools 7a, 7b, 7c and 7d, with the laid-in core matrix 2, respectively core pins 3 and 3a, which in this form 10 are of flat shape and which are fixed at the point of the forming plane 4—4. The blank R, in a known fashion, will be transported from a storage compartment into the heating coil H. With the blank having reached the deforming temperature, the core matrix or respectively the core pins 3, 3a, will be pushed into the hot blank which will then be moved by means of the pusher 5, 5a, into the opening of the roll pass 1 and fixed in rolling plane 4—4. Meanwhile, the pusher 5, 5a, continues its axial movement in direction 6, 6a to the roll pass so that the now rolled work blank W will be pushed away from core matrix 2 or respectively core pins 3, 3a and then ejected, as known, now as a deformed drill with inside open channels. A new work blank R will be pushed into the heating coil H and a new operational step starts.

FIG. 2 shows a section of Item W, for instance, twist drills with inside cooling channels 9. The work blank R can consist of a commercially available steel tube or a round, concentrically bored shape 2A. The core matrix 2 can originate from a cylindrical round shape and develops into 2 profiles — 8, 9, 10, corresponding to the eventual cooling channels. The tip 12 of the core matrix 2 of cone shape 23, is fixed to the forming plane 4—4 of the roll pass 1. Thus, product W will be ejected as a rolled twist drill in known fashion.

The core of the spiral drill originating from a tube shaped starting material consists of 2 parts 25, pressed together, welded to each other due to the high temperature and extremely high deformation pressure. It might be recommended to coat bore 2a of the work blank with a medium conducive to welding, when processing special steel grades.

The form and section of the channels depends on the form and section of the core matrix 2, respectively core pins 3 located in the forming plane 4—4. By virtue of the cone shape 23, it is possible to vary the form and section of the channels. The opening of the channels can be governed by the axial movement 13, 13a of core matrix 2 or core pins 3. The axial movement of core matrix 2 respectively core pins 3, can be connected with the movement of the work blank, permitting a proportional reduction in area of the channels 8 and 9.

We define as the forming plane or rolling plane 4—4 the location of the roll pass 1 where the axis 24—24 of the roll tools 7a, 7b, 7c, 7d cross the axis of the product W. The roll pass at this position consists of its smallest section and the rolling of the product is completed. The changes in sections of the channels in FIGS. 1 and 4 is indicated as Item 15.

FIG. 3 shows an axial section for twist drills over 5 mm diameter. The work blank R will be provided with 2 or several bores 3a in known fashion. Having reached the deformation temperature, core pins 3 will be pushed in at which time the blank will be transported to the opening of roll pass 1. In the meantime, roll tools 7a, 7b, 7c, 7d will move in direction 14 and the deforming process begins.

The core pins 3, which hereby mean the core matrix of the roll caliber, 1, will be fixed to the deforming plane 4—4. The formed product W will thus be removed from it and ejected in known manner.

Subsequently a new work blank R will be pushed into heating coil H (FIGS. 6 and 7) and a new working period starts.

FIG. 4 shows a section of product W which was processed from the tube shaped original material as shown in FIG. 2. The 2 parts of the bore core welded together is shown in Item 25. The possible reduction in area 15 of the channels 9 is also shown.

Figure 5:
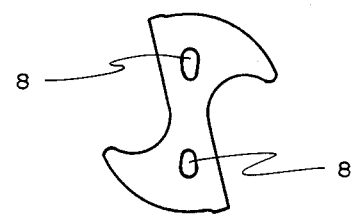
FIG. 5 is a sectional view of a variation of the product produced.

FIG. 5 shows as a further variation of the invention the cooling channels 8 and 9 in drop shapes.

Figure 6:
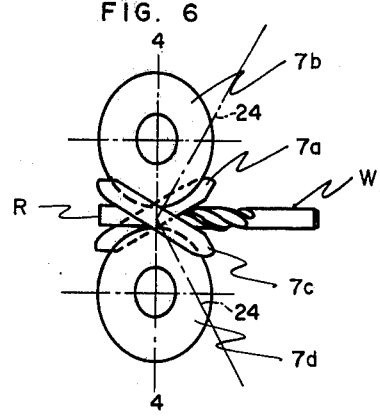
FIG. 6 is a schematic view of a forging means that can be used with the present invention.

FIG. 6 shows the schematic roll forging process, for example in accordance with U.S. Pat. No. 3,031,553, which can be used together with the above described invention for the production of twist drills with inside cooling channels 8 and 9.

Figure 7:
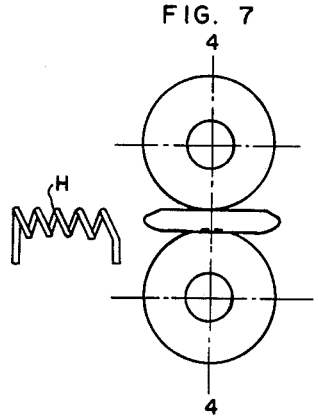
FIG. 7 is a schematic view of a variation of the means of FIG. 6.

FIG. 7 as a further variation of the invention shows the application as a pre-rolling phase of a known roll forging device. The roll pass 1 is hereby shown as a straight rolling device and equipped with the disclosed core matrix 2 respectively core pins 3 as shown in FIGS. 1-5. These variations of the invention will be used for example in making bigger twist drills, i.e., above 30 mm diameter.

FIG. 8 shows a longitudinal section of a further variation of the invention in connection with known extrusion pressing. The forming pass here consists of a closed ring 19 which can be used by the introduction of core matrix 2 for the production of twist drills and alike with inside cooling channels.

The core matrix 2, as disclosed in FIG. 2, is shown as a cone formed pin 23 corresponding to channels 21, the tip 12 of which is moved towards the deforming plane 20—20 of ring pass 19 and fixed thereon. The ring pass 19 which is designed for the production of twist drills can now be used by the introduction of core matrix 2 for the production of twist drills with inside cooling channels.

FIG. 9 shows a longitudinal section of the invention of core matrix 2 for a known extrusion pressing operation. The channel forming nose 23 of core matrix 2 is cone shaped and inclined by angle 16 towards the channel spiral. The form and section of the channels as per cone 23 or nose 12 located in the deforming plane 20—20 result in a variation of the section and shape of channels 21 by axial movement 13 of the core matrix 2.

It may be required with larger dimensions to re-cool the core matrix. In order to re-cool the core matrix, a bore 17 is provided together with tube 18 for the cooling medium.

FIG. 10 shows core matrix 2 as viewed from the tip of the core pins 12.

FIG. 11 shows the section of the ring caliber 19 with in-laid core matrix 2 in the deforming plane 20—20.

With the known roll forging process of twist drills or alike, the rolling process proceeds from the shaft to the drill tip. Contrary, with extrusion pressing the direction is reversed, i.e., from drill tip to shaft. Therefore, it is recommended in case of bigger drills equipped with cone shafts to attach the shaft portion making use of a less expensive material subsequently, i.e., by welding.

By using core matrix 2 or core pins, channels 8, 9 and 21 of the product remain open so that one eliminates to fill the holes of the work blank prior to its forming process with a previously known copper which later needs to be melted out again. The production of inside channel drills with extrusion pressing has only been possible in bigger dimensions due to the uncontrollability of the form and section of the channels using metal fillings.

From the above, it is obvious that the present invention has the advantage of providing a spiral type drill having interior cooling channels which is less expensive to produce and yet is superior in quality to prior known means.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method for chipless production of twist drills having inside, open cooling channels, comprising the steps of:

providing an elongate blank having at least one bore formed therein, maintaining said bore free of filling metal while forging at least one spirally shaped flute in the outer surface of said blank by engaging said outer surface with forging tool means at a forging plane and producing relative longitudinal movement between said blank and said forging plane, and simultaneously providing core matrix means within said at least one bore, said core matrix means having an outer core forming area, and positioning said core forming area at said forging plane during the forging of said at least one spirally shaped flute whereby at least one continuous elongate open channel is formed within said drill simultaneous with the formation of said at least one spirally shaped flute.

2. The method set forth in claim 1 wherein said core matrix includes a plurality of spaced apart and distinct core forming areas each having a cross sectional configuration in said forging plane which has the shape of the desired cooling channels whereby a plurality of spaced apart cooling channels are formed in said drill.

3. The method set forth in claim 1 wherein said core matrix means is tapered, and the step of producing relative movement between the tapered portion of said core matrix and said forging plane during said forging step whereby the cross sectional area of said cooling channel will vary in the longitudinal direction.

4. The method set forth in claim 1 and including the step of rolling longitudinally extending linear areas in said blank prior to the forging thereof.

5. The method set forth in claim 4 wherein the matrix means are introduced into said blank during said rolling step.

6. The method as set forth in claim 1 wherein said blank has a single longitudinal bore, and said core matrix means has a pair of longitudinally projecting core forming portions which are spaced apart from each other in said forging plane whereby the material of said blank is forced into proximity in the area between said core forming portions during the forging step, and including the step of coating said bore with a welding medium prior to said forging step, and welding said proximate portions of said blank after said forging step to provide a pair of distinct cooling channels therein.

7. The method set forth in claim 1 wherein said blank includes a pair of longitudinally extending bores, and said core forming matrix comprises a pair of longitudinally extending pins each having a cross section in said forging plane which has the desired configurations of said channels.

8. The method set forth in claim 1 wherein said forging tool means comprises a roll forging apparatus and including the step of roll forging said blank to form said spirally shaped flutes.

9. The method set forth in claim 1 wherein said forging means comprises extrusion apparatus and wherein said forging step comprises the step of extruding said blank to form said at least one spirally shaped flute therein.

10. The method set forth in claim 1 and including the step of heating said blank prior to said forging step.

11. The method set forth in claim 1 wherein the transverse cross section of said core forming area conforms with the cross sectional configuration of said cooling channel, and including the step of maintaining the core matrix means at said forging plane during said relative movement between said blank and forging tool means to form at least one continuous elongate channel of substantially uniform transverse cross sectional area.

12. The method set forth in claim 11 wherein said core matrix means includes a plurality of spaced apart and distinct core forming areas each having a cross sectional configuration in said foregoing plane which has the shape of the desired cooling channels whereby a plurality of spaced apart cooling channels are formed in said drill.

13. The method set forth in claim 12 and including the step of rolling longitudinally extending linear areas in said blank prior to the forging thereof.

14. The method set forth in claim 12 wherein said blank has a single longitudinal bore, and said core matrix means has a pair of longitudinally projecting core forming portions which are spaced apart from each other in said forging plane whereby the material of said blank is forced into proximity in the area between said core forming portions during the forging step, and including the step of coating said bore with a welding medium prior to said forging step, and welding said proximate portions of said blank after said forging step to provide a pair of distinct cooling channels therein.

15. The method set forth in claim 12 wherein said blank includes a pair of longitudinally extending bores, and said core forming matrix means comprises a pair of longitudinally extending pins each having a cross section in said forming plane which has the desired configurations of said channels.

16. An apparatus for forming from an elongate blank having at least one longitudinal bore twist drills having a plurality of longitudinal cooling channels in the interior thereof and at least one spirally arranged flute on the outer surface thereof, said apparatus including forging means for engaging the outer surface of an elongate blank member and for forging said at least one flute therein, means for moving said blank axially relative to said forging means, and core matrix means extending axially into the at least one bore formed in said blank, said core matrix means including a plurality of projecting means having portions lying in the forging plane of said forging means, said projecting means being spaced apart from each other to provide a plurality of longitudinally extending cooling passages in said drill as said blank is moved relative to said forging plane, the outer surfaces of said core matrix portions conforming to the cross-sectional configuration of said passages.

17. The apparatus set forth in claim 16 wherein each of said projections are tapered, and means for moving said core matrix in a direction opposite to the direction of movement of said blank whereby said cooling passages are tapered.

18. The apparatus set forth in claim 16 and including rod means engaging the end of said blank for moving the latter longitudinally and relative to said forging plane, said rod means being hollow, said core forming matrix means being elongate and having a cross sectional area smaller than the hollow interior of said rod means extending through said rod means and into the at least one bore of the blank.

19. The apparatus set forth in claim 18 wherein said forging means comprises roll forming apparatus having a plurality of rolls surrounding said blank and generally defining a closed area at said forging plane.

20. The apparatus set forth in claim 18 wherein said forging means comprises an extrusion press having an extrusion opening which generally defines an enclosed area and defining said forging plane.

* * * * *